US008804961B2

(12) United States Patent
Guo et al.

(10) Patent No.: US 8,804,961 B2
(45) Date of Patent: Aug. 12, 2014

(54) METHOD AND SYSTEM FOR MOBILE TERMINALS HANDING OVER BETWEEN CLEAR SESSION AND ENCRYPTED SESSION COMMUNICATIONS

(75) Inventors: Hongxing Guo, Shenzhen (CN); Fangmin Deng, Shenzhen (CN); Baolin Xue, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/640,358

(22) PCT Filed: Jan. 17, 2011

(86) PCT No.: PCT/CN2011/070330
§ 371 (c)(1),
(2), (4) Date: Oct. 10, 2012

(87) PCT Pub. No.: WO2012/019443
PCT Pub. Date: Feb. 16, 2012

(65) Prior Publication Data
US 2013/0136261 A1 May 30, 2013

(30) Foreign Application Priority Data
Aug. 11, 2010 (CN) .......................... 2010 1 0254330

(51) Int. Cl.
*H04K 1/00* (2006.01)
*H04L 29/06* (2006.01)
*H04L 9/28* (2006.01)
*H04W 12/02* (2009.01)
*H04W 12/04* (2009.01)
*H04W 36/00* (2009.01)

(52) U.S. Cl.
CPC ................ *H04L 9/28* (2013.01); *H04W 12/04* (2013.01); *H04L 63/18* (2013.01); *H04W 36/00* (2013.01); *H04W 12/02* (2013.01)
USPC ....................................................... 380/270

(58) Field of Classification Search
CPC ......... H04L 9/28; H04L 63/18; H04W 12/02; H04W 12/04
USPC ................... 380/270; 370/352–354
See application file for complete search history.

(56) References Cited

U.S. PATENT DOCUMENTS
5,974,142 A * 10/1999 Heer et al. ..................... 379/442
6,574,213 B1 * 6/2003 Anandakumar et al. ...... 370/349
(Continued)

FOREIGN PATENT DOCUMENTS
CN         1753348 A      3/2006
(Continued)

OTHER PUBLICATIONS
Shao Lin etc ., Identity-based end-to-end authentication and key agreement protocol in mobile communication, Application Research of Computers, Aug. 2008, vol. 25 No. 8, p. 2457-2459.
(Continued)

*Primary Examiner* — Samson Lemma
(74) *Attorney, Agent, or Firm* — Ling Wu; Stephen Yang; Ling and Yang Intellectual Property

(57) ABSTRACT
The present invention discloses a method for clear session and scrambled session communication switch between mobile terminals comprising: a first terminal initiating a scrambled session switch control request to a second terminal, and the second terminal returning a scrambled session switch control response after receiving the scrambled session switch control request; and the first terminal initiating a key negotiation process with the second terminal after receiving the scrambled session switch control response returned by the second terminal, and then transferring to scrambled session communication or suspending the scrambled session communication with the second terminal; wherein the scrambled session switch control request includes a scrambled session request or a clear session request. The present invention further provides a system for clear session and scrambled session communication switch between mobile terminals comprising a scrambled session switch control module and an encryption module set in a mobile terminal. The present invention protects end-to-end security in the communication process of the mobile terminals effectively.

7 Claims, 1 Drawing Sheet

(56) References Cited

U.S. PATENT DOCUMENTS

| | | | |
|---|---|---|---|
| 7,324,645 B1 * | 1/2008 | Juopperi et al. | 380/247 |
| 2002/0102998 A1 * | 8/2002 | Lin | 455/466 |
| 2006/0115088 A1 * | 6/2006 | Valentine et al. | 380/270 |
| 2011/0182221 A1 * | 7/2011 | Arakawa | 370/311 |

FOREIGN PATENT DOCUMENTS

| | | | |
|---|---|---|---|
| CN | 101056176 A | | 10/2007 |
| CN | 101442742 A | | 5/2009 |
| CN | 101931949 A | | 12/2010 |
| EP | 1388970 A1 | * | 2/2004 |
| EP | 2192815 A1 | * | 6/2010 |
| WO | 0018165 A1 | | 3/2000 |
| WO | WO 0018165 A1 | * | 3/2000 |

OTHER PUBLICATIONS

International Search Report for PCT/CN2011/070330 dated May 10, 2011.

* cited by examiner

METHOD AND SYSTEM FOR MOBILE TERMINALS HANDING OVER BETWEEN CLEAR SESSION AND ENCRYPTED SESSION COMMUNICATIONS

TECHNICAL FIELD

The present invention relates to the field of mobile communication technology, and in particular, to a method and system for clear session and scrambled session communication handover switch between mobile terminals.

BACKGROUND OF THE RELATED ART

End-to-end communication encryption is a technology for encrypting and decrypting voice/data, etc., which can implement encryption transmission of voice/data signals in air interfaces and core networks to further enhance security of communication. The end-to-end encrypted communication is usually called as scrambled session, and the non-encrypted communication is called as clear session. With the development of secure communication technology, free switch between the clear session and the scrambled session has become the requirement for users at both sides of communication. Most of currently known clear session and scrambled session switch technologies need cooperation of terminals and network devices, or control switch through end-to-end in-band signaling.

For example, Chinese patent CN200510007514 discloses a "method for realizing switch between clear session and scrambled session in end-to-end voice communication", which is applicable to a soft switch system comprising a switch, a key distribution center, a base station controller, a public telephone switching network and an encryption gateway. When a calling party and a called party establish a call and talk normally, the method includes the following steps. After receiving a switch request, the switch determines the current talking manner, and if the current talking manner is clear session, then a switch where one party initiating the switch request is located switches the current session to scrambled session after applying a key from the key distribution center; if the current talking manner is scrambled session, then the switch where the party initiating the switch request is located sends a scrambled session closing message to a switch where another party is located and switches the current session to clear session and closes a cue tone.

Disadvantages existing in the patent is that its implementation process is relatively complex, switch between clear session and scrambled session needs cooperation of the switch, the key distribution center and the base station controller, the requirement for network devices is high, and implementation cost is high, thus real end-to-end control cannot be implemented.

As another example, Chinese patent CN200410080036 discloses "a method for realizing switch from clear session to scrambled session", which comprises the following steps. A first terminal sends a scrambled session service transferring request to a second terminal, and notifies the second terminal to start scrambled session service negotiation with the network side, while the first terminal starts scrambled session service negotiation with the network side; after a scrambled session transmission channel is established, a scrambled session talking process is performed between the first terminal and second terminal. According to this method, first the scrambled session service negotiation between the terminals is transferred, and then a scrambled session transparent transmission channel is established to guarantee smooth implementation of switch from clear session to scrambled session. In addition, the patent further proposes process control which can implement switch from clear session to scrambled session through in-band signaling. Thus, any influence on existing networks will not be caused, and cooperation of the existing networks is not required. If there are private networks superposing on universal networks, then each private network can define a signaling structure by itself, and can expand signaling content arbitrarily to provide great convenience for the private networks and the universal networks.

However, the above-mentioned patents have some disadvantages: 1) the switch process still needs cooperation of the networks, terminals at both sides of the communication are required to complete scrambled session negotiation with the network side respectively, thus end-to-end control cannot be implemented really; 2) the switch control process uses in-band signaling, such as dual tone multi frequency (DTMF), and information carried in the voice in-band signaling is limited (for example, only one bit data can be sent every time), and the transmission efficiency is low, thus resulting in a longer switch process.

CONTENT OF THE INVENTION

A technical problem solved by the present invention is to provide a method and system for clear session and scrambled session communication switch between mobile terminals so as to implement end-to-end switch control, guarantee a quick and smooth clear session and scrambled session switch process, and have no influence on the existing network.

In order to solve the above-mentioned technical problem, the present invention provides a method for clear session and scrambled session communication switch between mobile terminals comprising:

a first terminal initiating a scrambled session switch control request to a second terminal, and the second terminal returning a scrambled switch handover control response after receiving the scrambled session switch control request; and the first terminal initiating a key negotiation process with the second terminal after receiving the scrambled session switch control response returned by the second terminal, and then transferring to scrambled session communication or suspending the scrambled session communication with the second terminal;

wherein the scrambled session switch control request includes a scrambled session request or a clear session request.

After the first terminal and the second terminal have established clear session communication, when the first terminal requests to switch the current clear session communication to the scrambled session, the step of the first terminal initiating the key negotiation process with the second terminal after receiving the scrambled session switch control response returned by the second terminal and then transferring to scrambled session communication comprises:

after the first terminal initiates the scrambled session request to the second terminal, if a scrambled session request response of the second terminal is received in a preset time, then the first terminal starting the key negotiation process with the second terminal; and after the key negotiation process is completed, the first terminal initiating a scrambled session transferring request, the second terminal returning a scrambled session transferring response after receiving the scrambled session transferring request while starting the scrambled session; and the first terminal starting the scrambled session after receiving the scrambled session transferring response, and the first terminal and the second terminal entering into the scrambled session communication.

After the first terminal and the second terminal have established the scrambled session communication, when the first terminal requests to switch the current scrambled session communication to the clear session, the step of the first terminal suspending the scrambled session communication with the second terminal comprises:

after the first terminal and the second terminal have established the scrambled session communication, the first terminal initiating a clear session transferring request to the second terminal; and the second terminal returning a clear session transferring response after receiving the clear session transferring request while suspending the scrambled session and starting the clear session; and the first terminal suspending the scrambled session and starting the clear session after receiving the clear session transferring response, and the first terminal and the second terminal entering into the clear session communication.

The scrambled session request, the scrambled session request response, the scrambled session transferring request, the scrambled session transferring response, the clear session transferring request and the clear session transferring response use end-to-end signaling messages.

In the step of the first terminal starting the key negotiation process with the second terminal, the key negotiation process between the first terminal and the second terminal is an end-to-end key negotiation process; and the key negotiation between the first terminal and the second terminal uses an end-to-end signaling message.

The end-to-end signaling message includes a user information message, and carries a command type and/or parameter through a user-user field of the user information message.

In order to solve the above-mentioned technical problem, the present invention further provides a system for clear session and scrambled session communication switch between mobile terminals comprising a scrambled session switch control module and an encryption module set in a mobile terminal, wherein the scrambled session switch control module is configured to initiate a scrambled session switch control request to an opposite communication end, the scrambled session switch control request including a scrambled session request or a clear session request, and initiate a key negotiation process with the opposite communication end according to a received scrambled session switch control response, and then transfer to scrambled session communication with the opposite communication end, or suspend the scrambled session communication with the opposite communication end, and return the scrambled session switch control response after receiving the scrambled session switch control request initiated by the opposite communication end; and the encryption module is configured to start the scrambled session after transferring to the scrambled session communication, perform an encryption operation on the sent voice/data according to a negotiated key and an encryption algorithm, perform a decryption operation on the received voice or data, start the clear session after suspending the scrambled session communication, and cancel the encryption operation and decryption operation on the voice or data.

The scrambled session switch control module is configured to initiate the scrambled session switch control request to the opposite communication end, and initiate the key negotiation process with the opposite communication end according to the received scrambled session switch control response, and then transfer to the scrambled session communication with the opposite communication end by initiating a scrambled session request to the opposite communication end when deciding to switch the current clear session communication to the scrambled session, starting the key negotiation process with the opposite communication end if receiving a scrambled session request response in a preset time, initiating a scrambled session transferring request to the opposite communication end after the key negotiation process is completed, and notifying the encryption module to transfer to the scrambled session communication after receiving a scrambled session transferring response, or returning the scrambled session transferring response after receiving the scrambled session transferring request initiated by the opposite communication end while notifying the encryption module to transfer to the scrambled session communication.

The scrambled session switch control module is configured to suspend the scrambled session communication with the opposite communication end by initiating a clear session transferring request to the opposite communication end when deciding to switch the current scrambled session communication to clear session, and notifying the encryption module to suspend the scrambled session communication after receiving a clear session transferring response, or returning the clear session transferring response after receiving the clear session transferring request initiated by the opposite communication end while notifying the encryption module to suspend the scrambled session communication.

The scrambled session switch control module is configured to use an end-to-end signaling message to perform the following signaling interaction with the opposite communication end: the scrambled session request, the scrambled session request response, the scrambled session transferring request, the scrambled session transferring response, the clear session transferring request and the clear session transferring response, and use the end-to-end signaling message to perform the key negotiation with the opposite communication end.

Using the technical scheme described above, the present invention implements quick switch of the clear session and the scrambled session between the mobile terminals, and protects end-to-end security in the communication process of the mobile terminals effectively.

In addition, the present invention also proposes a method for transmitting a switch control command through a user information message so as to guarantee quick and effective transmission of control signaling associated with switch between both sides without influencing the communication process of users and guarantee the smooth clear session/scrambled session switch. In the case that the two communication sides have established the communication, the user information is an end-to-end direct transmission message. The side initiating the scrambled session/clear session switch indicates the type and parameter (such as a key) of a request command in a user-user field of the message, and the side receiving switch carries the type and parameter of a response command in this field (such as a failure reason value). By use of the user information message, end-to-end switch control is implemented really without participation of network devices, and the existing network devices will not be influenced.

PREFERRED EMBODIMENTS OF THE PRESENT INVENTION

Figure 1:
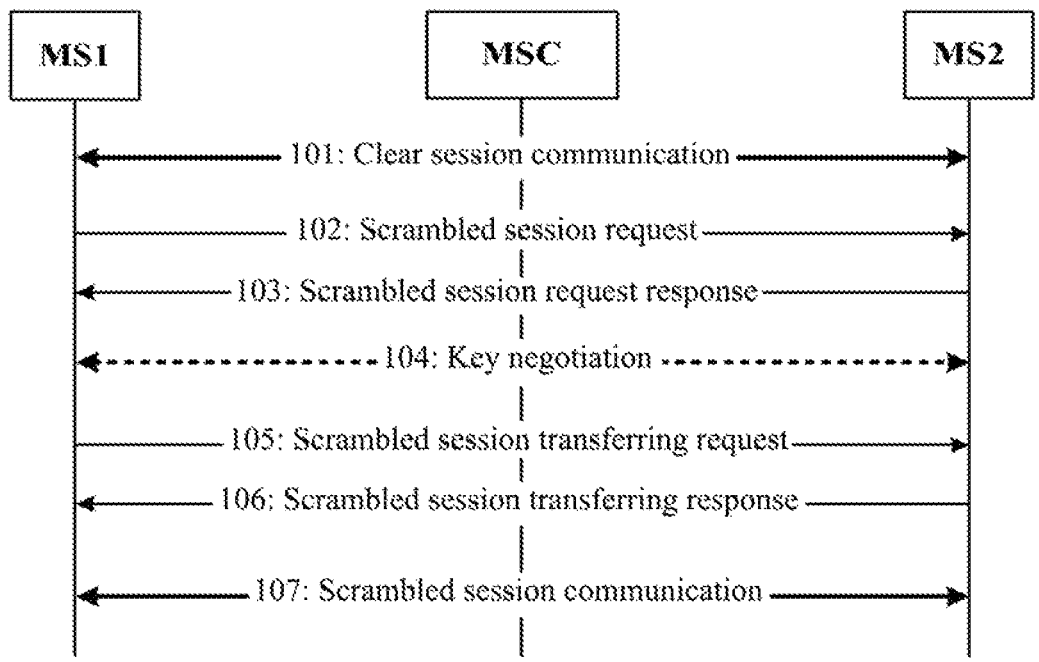
FIG. 1 is a flow chart of switch from clear session to scrambled session between mobile terminals according to an embodiment of the present invention.
Figure 2:
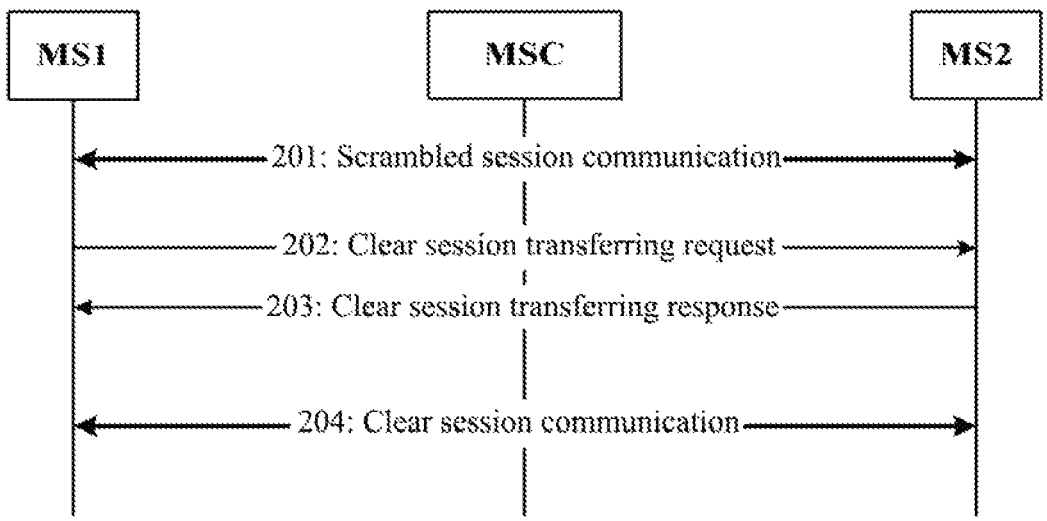
FIG. 2 is a flow chart of switch from scrambled session to clear session between mobile terminals according to an embodiment of the present invention.

An object of the present invention is to provide a method for clear session and scrambled session communication switch between mobile terminals so as to implement end-to-end switch control without intervention or cooperation of the network side, and protect end-to-end security in the mobile terminal communication process effectively.

In order to realize the above-mentioned object, the present invention provides a method for clear session and scrambled session communication handover between mobile terminals. Specifically, the following technical scheme is used.

A first terminal initiates a scrambled session switch control request to a second terminal, and the second terminal returns a scrambled session switch control response after receiving the scrambled session switch control request.

The first terminal initiates a key negotiation process with the second terminal after receiving the scrambled session switch control response returned by the second terminal, and then transfers to scrambled session communication or suspends the scrambled session communication with the second terminal.

The scrambled session switch control request includes a scrambled session request or a clear session request.

The first terminal, which may be a calling terminal or a called terminal, is an initiating side of the scrambled session switch control request; the second terminal is a receiving side of the scrambled session switch control request.

Further, after the first terminal and the second terminal have established clear session communication, when the first terminal requests to switch the current clear session communication to the scrambled session, the method specifically comprises:

after the first terminal initiates the scrambled session request to the second terminal, if a scrambled session request response of the second terminal is received in a preset time, then the first terminal starts the key negotiation process with the second terminal; and after the key negotiation process is completed, the first terminal initiating a scrambled session transferring request, the second terminal returning a scrambled session transferring response after receiving the scrambled session transferring request while starting the scrambled session; and the first terminal starting the scrambled session after receiving the scrambled session transferring response, and the first terminal and the second terminal entering into the scrambled session communication.

Further, after the first terminal and the second terminal have established the scrambled session communication, when the first terminal requests to switch the current scrambled session communication to the clear session, the method specifically comprises:

after the first terminal and the second terminal have established the scrambled session communication, the first terminal initiating a clear session transferring request to the second terminal; and the second terminal returning a clear session transferring response after receiving the clear session transferring request while suspending the scrambled session and starting the clear session; and the first terminal suspending the scrambled session and starting the clear session after receiving the clear session transferring response, and the first terminal and the second terminal entering into the clear session communication.

Further, the scrambled session request, the scrambled session request response, the scrambled session transferring request, the scrambled session transferring response, the clear session transferring request, the clear session transferring response and the key negotiation use end-to-end signaling messages.

Further, the key negotiation process between the first terminal and the second terminal is an end-to-end key negotiation process; and the key negotiation between the first terminal and the second terminal uses an end-to-end signaling message.

Further, the end-to-end signaling message includes user an information message, and carries a command type and/or parameter through a user-user field of the user information message.

The implementation of the technical scheme of the present invention will be described in detail below in conjunction with the accompanying drawings and specific embodiments. It should be noted that in the case of no confliction, the embodiments of the present application and features in these embodiments can be combined with each other arbitrarily.

FIG. 1 is a flow chart of switch from clear session to scrambled session between mobile terminals according to an embodiment of the present invention. An information transmission channel between a MS1 and MS2 is constructed through a mobile switching center (MSC). In the process of switch from clear session to scrambled session, all control signaling interactions between the MS1 and MS2 are transparent for the MSC, that is, the interactions are end-to-end and the MSC does not intervene. Referring to FIG. 1, the procedure of the present embodiment includes the following steps specifically.

In step 101, clear session communication is performed between the mobile terminals MS1 and MS2.

In step 102, the MS1 sends a scrambled session request to the MS2.

In step 103, after receiving the scrambled session request sent by the MS1, the MS2 can determine whether to accept the invitation according to situations; if the invitation is accepted, then the MS2 sends a scrambled session request response command to the MS1, and indicates acknowledgement of the scrambled session request in a reason value, and the procedure proceeds to step 104; if the invitation is not accepted, the MS2 indicates refusal of the scrambled session request in the reason value of the scrambled session request response command, the procedure ends at this point and returns to the clear session communication state in step 101.

Abnormal conditions include that the MS2 does not support the scrambled session function, or is unable to respond to the scrambled session request response. When the MS1 can not get the response message of the MS2 in a preset time, the procedure ends and returns to the clear session communication state in step 101.

In step 104, the MS1 and the MS2 performs encrypted key and algorithm negotiation.

It should be noted that unlike the case that participation of the third party (such as a switch and/or a key distribution center) is required in the key negotiation process in the prior art, the key negotiation process of the present invention is an end-to-end key negotiation process, which may include multiple interactions, depending on a key negotiation method between the MS1 and the MS2 specifically. The key negotiation method may be private keys plus public keys, or sharing keys, etc. Depending on the difference of the specific encryption methods, negotiation interactions and the number thereof between the MS1 and MS2 might be different, but the whole negotiation process, which is completed through user information messages, is end-to-end interaction. For example, in the negotiation process, the MS1 sends a negotiation request to the MS2, and indicates the key and encryption algorithm in the request message; after the MS2 receives the request, it processes and sends back a response to the MS1 according to its own ability, and the MS1 completes the key negotiation process after receiving the response.

In step 105, after the MS1 and the MS2 complete the key negotiation, the MS1 sends a scrambled session transferring request to the MS2.

In step 106, the MS2 receives the scrambled session transferring request of the MS1 and starts an encryption operation of the MS2 (encrypts voice/data) according to the key and algorithm negotiated in step 104 while sending a scrambled session transferring response to the MS1; if the scrambled session transferring response received by the MS1 is a scrambled session acknowledgement instruction, the encryption operation of the MS1 is started according to the key and algorithm negotiated in step 104 so as to start the scrambled session.

In step 107, the MS1 and the MS2 perform the encryption operation on their respectively sent data, perform the decryption operation on the received data, and enter into the scrambled session communication process.

All interaction commands are transmitted between the MS1 and the MS2 through a user information message in the above steps. The message is an end-to-end signaling message, and the network is only transparent transmission. A user-user field of the message contains a specific switch control command. The present invention gives a basic command example, such as command type+parameter 1+parameter 2, where the contained parameters are optional items, but the specific command and parameter format are not limited thereto. Specifically, in addition to a scrambled session request, scrambled session request acknowledgement, scrambled session request refusal, scrambled session transferring request or clear session transferring request, scrambled session transferring acknowledgement or clear session transferring acknowledgement, and scrambled session transferring request refusal or clear session transferring request refusal, the command type contained in the user-user field may include a key negotiation command in key negotiation signaling, and transmits key parameters, such as the encryption algorithm and key information, etc., through the user-user field of the user information message.

The procedure of switch from scrambled session to clear session between mobile terminals according to an embodiment of the present invention includes the following steps.

All interaction commands are transmitted between the MS1 and the MS2 through a user information message in the above steps. The message is an end-to-end signaling message, and the network is only transparent transmission. A user-user field of the message contains a specific switch control command. The present invention gives a basic command example, the specific command and parameter format are not limited thereto.

In step 201, scrambled session communication is performed between the mobile terminals MS1 and MS2.

In step 202, the MS1 sends a clear session transferring request command to the MS2.

In step 203, after receiving the clear session transferring request sent by the MS1, the MS2 suspends its encryption and decryption operation while sending a clear session transferring response command to the MS1; the MS1 receives a clear session transferring acknowledgement instruction, and suspends its encryption and decryption operation.

In step 204, the MS1 and the MS2 return to the clear session communication process.

Accordingly, an embodiment of the present invention further provides a system for clear session and scrambled session communication switch between mobile terminals (not shown) comprising a scrambled session switch control module and an encryption module set in a mobile terminal.

The scrambled session switch control module is configured to initiate a scrambled session switch control request to an opposite communication end, the scrambled session switch control request including a scrambled session request or a clear session request, and initiate a key negotiation process with the opposite communication end according to a received scrambled session switch control response, and then transfer to scrambled session communication with the opposite communication end, or suspend the scrambled session communication with the opposite communication end, and return the scrambled session switch control response after receiving the scrambled session switch control request initiated by the opposite communication end.

The encryption module is configured to start the scrambled session after transferring to the scrambled session communication, perform an encryption operation on the sent voice/data according to a negotiated key and an encryption algorithm, perform a decryption operation on the received voice or data, start the clear session after suspending the scrambled session communication, and cancel the encryption operation and decryption operation on the voice or data.

The scrambled session switch control module is further configured to initiate a scrambled session request to the opposite communication end when deciding to switch the current clear session communication to scrambled session, start a key negotiation process with the opposite communication end if receiving a scrambled session request response in a preset time, initiate a scrambled session transferring request to the opposite communication end after the key negotiation process is completed, and notify the encryption module to transfer to the scrambled session communication after receiving the scrambled session transferring response, or return the scrambled session transferring response after receiving the scrambled session transferring request initiated by the opposite communication end while notifying the encryption module to transfer to the scrambled session communication.

The scrambled session switch control module is further configured to initiate a clear session transferring request to the opposite communication end when deciding to switch the current scrambled session communication to clear session, and notify the encryption module to suspend the scrambled session communication after receiving a clear session transferring response, or return the clear session transferring response after receiving the clear session transferring request initiated by the opposite communication end while notifying the encryption module to suspend the scrambled session communication.

The scrambled session switch control module is further configured to use an end-to-end signaling message to perform the following signaling interaction with the opposite communication end: the scrambled session request, the scrambled session request response, the scrambled session transferring request, the scrambled session transferring response, the clear session transferring request and the clear session transferring response, and use the end-to-end signaling message to perform the key negotiation with the opposite communication end.

The above description is only the preferred embodiments of the present invention and is not intended to limit the present invention. Other various embodiments may be possible. Various corresponding modifications and variations to the present invention may be made by those skilled in the art without departing from the spirit and essence of the present invention. However, such corresponding modifications and variations should be covered in the protect scope of the appended claims of the present invention.

It may be understood by those skilled in the art that all or some of the steps in the described method can be implemented by related hardware instructed by programs which may be stored in computer readable storage mediums, such as read-only memory, disk or CD-ROM, etc. Alternatively, all or some of the steps in the embodiments described above may also be implemented using one or more integrated circuits. Accordingly, each module/unit in the embodiments described above may be implemented in a form of hardware, or software functional module. The present invention is not limited to combinations of hardware and software in any particular form.

INDUSTRIAL APPLICABILITY

The present invention implements quick switch of clear session and scrambled session between mobile terminals, protects end-to-end security in the communication process of the mobile terminal effectively. In addition, the present invention also proposes a method for transmitting a switch control command through a user information message so as to guarantee quick and effective transmission of control signaling associated with switch between both sides without influencing the communication process of users and guarantee the smooth clear session/scrambled session switch. By use of the user information message, end-to-end switch control is implemented really without participation of network devices, and the existing network devices will not be influenced.

What is claimed is:

1. A method for clear session and scrambled session communication switch between mobile terminals comprising:
    after a first terminal and a second terminal have established clear session communication, the first terminal initiating a scrambled session request to the second terminal, if a scrambled session request response of the second terminal indicating the scrambled session request being accepted by the second terminal is received in a preset time, then the first terminal starting the key negotiation process with the second terminal;
    after the key negotiation process is completed, the first terminal initiating a scrambled session transferring request to the second terminal, the second terminal returning a scrambled session transferring response after receiving the scrambled session transferring request while starting the scrambled session; and the first terminal starting the scrambled session after receiving the scrambled session transferring response, and the first terminal and the second terminal entering into the scrambled session communication;
    wherein the scrambled session request, the scrambled session request response, the scrambled session transferring request, and the scrambled session transferring response are transmitted by using end-to-end signaling messages; and
    wherein the end-to-end signaling message includes a user information message, and carries a command type and/or parameter through a user-user field of the user information message in 3GPP protocol, wherein the command type comprises one of the scrambled session request, the scrambled session request response, the scrambled session transferring request, and the scrambled session transferring response.

2. The method according to claim 1, further comprises:
    after the first terminal and the second terminal have established the scrambled session communication, when the first terminal requests to switch the current scrambled session communication to the clear session, the first terminal initiating a clear session transferring request to the second terminal; and
    the second terminal returning a clear session transferring response after receiving the clear session transferring request while suspending the scrambled session and starting the clear session; and the first terminal suspending the scrambled session and starting the clear session after receiving the clear session transferring response, and the first terminal and the second terminal entering into the clear session communication.

3. The method according to claim 2, wherein the clear session transferring request and the clear session transferring response are transmitted by using end-to-end signaling messages.

4. The method according to claim 1, wherein in the step of the first terminal starting the key negotiation process with the second terminal,
    the key negotiation process between the first terminal and the second terminal is an end-to-end key negotiation process; and
    the key negotiation between the first terminal and the second terminal uses an end-to-end signaling message.

5. A system for clear session and scrambled session communication switch between mobile terminals comprising a scrambled session switch control module and an encryption module set in a mobile terminal, wherein
    the scrambled session switch control module is implemented by a processor in the mobile terminal, and initiates a scrambled session request to an opposite communication end when deciding to switch the current clear session communication to the scrambled session;
    said scrambled session switch control module starts a key negotiation process with the opposite communication end if receiving a scrambled session request response in a preset time sent by the opposite communication end, wherein the scrambled session request response indicates the session scrambled request is accepted by the opposite communication end;
    and then said scrambled session handover control module notifies the encryption module to switch to the scrambled session communication after receiving a scrambled session transferring response, or returns a second scrambled session transferring response after receiving a second scrambled session transferring request initiated by the opposite communication end while notifying the encryption module to switch to the scrambled session communication;
    the encryption module is implemented by the processor in the mobile terminal, and after switching to the scrambled session communication, said encryption module starts the scrambled session, performs an encryption operation on a sent voice/data according to a negotiated key and an encryption algorithm and performs a decryption operation on the received voice or data;
    the scrambled session switch control module is configured to use an end-to-end signaling message to perform the following signaling interaction with the opposite communication end: the scrambled session request, the scrambled session request response, the scrambled session transferring request, and the scrambled session transferring response, wherein the end-to-end signaling message includes a user information message, and carries a command type and/or parameter through a user-user field of the user information message in 3GPP protocol, wherein the command type comprises one of the scrambled session request, the scrambled session request response, the scrambled session transferring request, and the scrambled session transferring response.

6. The system according to claim 5, wherein
the scrambled session handover control module is further configured to initiate a clear session transferring request to the opposite communication end when deciding to switch the current scrambled session communication to clear session, and notify the encryption module to suspend the scrambled session communication after receiving a clear session transferring response, or returning a second clear session transferring response after receiving a second clear session transferring request initiated by the opposite communication end while notifying the encryption module to suspend the scrambled session communication;

after suspending the scrambled session communication, said encryption module starts the clear session, and cancels the encryption operation and decryption operation on the voice or data.

7. The system according to claim 6, wherein
the scrambled session switch control module is configured to use an end-to-end signaling message to perform the following signaling interaction with the opposite communication end: the clear session transferring request and the clear session transferring response.

* * * * *